United States Patent [19] [11] 3,941,466

Shah [45] Mar. 2, 1976

[54] VERNIER CARRIAGE CONTROL

[75] Inventor: Rashmikant P. Shah, Hartford, Wis.

[73] Assignee: Bell & Howell Company, Chicago, Ill.

[22] Filed: Apr. 23, 1975

[21] Appl. No.: 571,034

[52] U.S. Cl. .......... 353/27 R
[51] Int. Cl.² .......... G03B 23/08
[58] Field of Search .......... 353/27 R, 22, 23; 33/1 M

[56] References Cited

UNITED STATES PATENTS

| | | | |
|---|---|---|---|
| 2,260,551 | 10/1941 | Boni | 353/27 R |
| 2,469,129 | 5/1949 | Reimann | 33/1 M |
| 3,072,013 | 1/1963 | Pratt | 353/27 R |
| 3,413,061 | 11/1968 | Simpson | 353/27 R |
| 3,781,102 | 12/1973 | Chandler | 353/27 R |

*Primary Examiner*—Richard E. Aegerter
*Assistant Examiner*—A. J. Mirabito
*Attorney, Agent, or Firm*—Robert A. Walsh

[57] ABSTRACT

The disclosure relates to an ultrafiche carriage assembly for use in an ultrafiche apparatus of the type which projects a magnified image of a selected one of a plurality of film frames on an ultrafiche onto a reference surface. Such ultrafiche readers include a light system and projection system and the present invention herein disclosed provides a carriage assembly allowing vernier control of the position of the film frames between the light and projection systems so that a particular film frame of a known location on the ultrafiche may be selected.

8 Claims, 5 Drawing Figures

VERNIER CARRIAGE CONTROL

BACKGROUND OF THE INVENTION

The present invention is directed to a reader apparatus of the type which projects a magnified image of a film frame onto the rear side of a viewing screen to facilitate forward viewing of the magnified image. The invention is more particularly directed to an improved ultrafiche reader which includes a carriage assembly for positioning a desired one of the film frames between the light system and projection system to facilitate viewing of the desired film frame.

Ultrafiche readers are well known in the art. Such devices generally comprise a light system and a projection system for magnifying and projecting one of the ultrafiche film frames onto a viewing screen. Inasmuch as there are a plurality of such film frames on a typical ultrafiche, they are extremely small, thus requiring a high order of magnification. As a result, only slight movement of the ultrafiche located between the light system and projection system causes a number of film frames to traverse across the optical axis of the projection system making the positioning of a desired film frame within the projection system optical axis difficult. It is therefore desirable to provide mechanical assistance to an operator so that a desired film frame of a known location on an ultrafiche may be more readily positioned within the optical axis of the projection system.

It is therefore a general object of the present invention to provide an improved ultrafiche reader apparatus.

It is another object of the present invention to provide an improved ultrafiche reader apparatus which includes an ultrafiche carriage assembly which affords a mechanical advantage to an operator so that a desired film frame may be selected for viewing.

It is a still further object of the present invention to provide an ultrafiche reader which has an ultrafiche carriage assembly affording vernier control of the position of the film frames of an ultrafiche to thereby reduce the criticality of operator manipulation while a particular film frame of known location on an ultrafiche is selected.

SUMMARY OF THE INVENTION

The invention provides an ultrafiche reader apparatus of the type which includes a light system and a projection system for projecting a magnified image of a selected one of a plurality of ultrafiche film frames onto a reference surface which has an improved ultrafiche carriage assembly for positioning a desired one of the film frames between the light system and projection system. The carriage assembly comprises a pair of spaced apart and substantially parallel glide members, first and second spaced apart and substantially parallel glide bars extending across the pair of glide members and transverse to the glide members, the second glide bar including a rack on a portion of at least one side thereof, a friction surface extending alongside of each of the glide members, first and second side supports for coupling the first and second glide bars together in fixed spaced apart relation, each of the first and second side supports including a rotatable wheel communicating with one of the friction surfaces, and an ultrafiche holder adapted for receiving an ultrafiche and extending across the first and second glide bars and including a rotatable pinion coupled to the rack of the second glide bar so that as the friction wheels are rotated, the ultrafiche holder is caused to glide along the first and second members in a first direction and as the pinion is rotated the ultrafiche holder is caused to glide upon the glide bars in a second direction transverse to the first direction to thereby afford positioning of a selected film frame between the light system and projection system.

BRIEF DESCRIPTION OF THE DRAWINGS

The invention, together with the objects and advantages thereof, may best be understood by reference to the following description taken in conjunction with the accompanying drawings, and in the several figures of which like reference numerals identify like elements and in which.

DESCRIPTION OF THE PREFERRED EMBODIMENT

Figure 1:
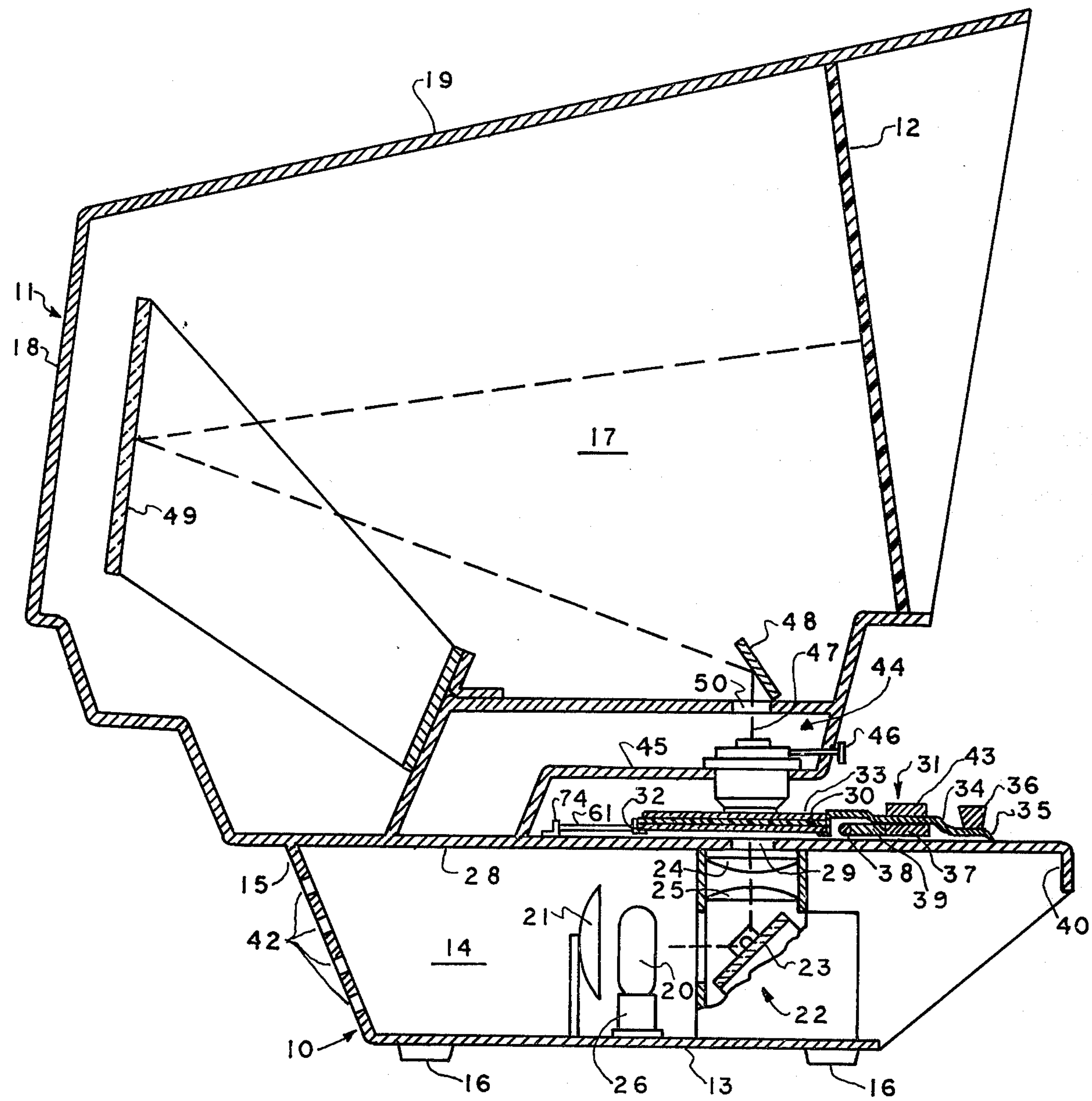
FIG. 1 is a side view partially in cross-section of an ultrafiche reader of the type embodying the present invention.

Referring now to FIG. 1, the ultrafiche reader thereshown comprises a base housing 10 which contains a light system and an upper housing 11 which includes a back projection type viewing screen 12. Base housing 10 has a bottom panel 13, side wall 14, a rear wall 15 and a front wall 40. The base housing 10 also includes feet 16 which are secured to the bottom panel 13 and upon which the base housing rests. Openings 42 in rear wall 15 provide ventilation for cooling the light system within base housing 10.

The upper housing includes a back wall 18, a side wall 17 and a top panel 19 which extends forward of screen 12 to reduce the amount of ambient light striking the screen 12. The viewing screen 12 is mounted within upper housing 11 in a rearwardly inclined position relative to the vertical to afford comfortable viewing.

The light system of base housing 10 comprises a light source or projection lamp 20, a reflector 21, an adjustable mirror assembly designated generally at 22 which includes mirror 23 and condensing lenses 24 and 25. The adjustable mirror assembly 22 is fully disclosed and claimed in co-pending patent application Ser. No. 563,949 filed on Mar. 31, 1975, and which is assigned to the assignee of the present invention.

Projection lamp 20 is mounted in a suitable socket 26 which connects the illuminating elements of projection lamp 20 to a suitable power source not shown. The reflector 21 concentrates and directs the light emitted from light source 20 toward mirror 23 which in turn reflects the light to and through the condensing lenses 24 and 25.

Separating the base housing 10 and upper housing 11 is plate 28 which includes an aperture 29 which allows the light emitted from light source 20 and reflected by mirror 23 to pass from the condensing lenses 24 and 25 to a selected image film frame on ultrafiche 30.

On top of plate 28 is an ultrafiche carriage assembly generally designated at 31 which embodies the present invention. The carriage assembly 31 includes an ultrafiche holder which comprises a bottom glass plate 32 and a top glass plate 33 for holding the ultrafiche 30 therebetween in a single plane between the light system and the projection system to be described hereinafter. The ultrafiche holder additionally includes an arm 34 having a pointer 35 which rides above a grid having location indicia for each film frame of the ultrafiche which may be more clearly seen in FIG. 2. On top of arm 34 is control knob 36 which may be utilized for course adjustment of the location of the ultrafiche film frames relative to the light system and projection system. Arm 34 of ultrafiche holder 31 also includes a pinion 37 which communicates with a rack 38 through idler 39. Pinion 37 is coupled to fine adjustment control knob 43 so that as control knob 43 is rotated, pinion 37 communicates with rack 38 through idler 39 to cause the film holder of the carriage assembly to move in one direction for fine adjustment of the position of the film frames. This feature is described in more detail with reference to FIGS. 2–5 hereinafter.

The upper housing in addition to including viewing screen 12, also includes a projection system which projects the magnified image of the selected image film frame onto viewing screen 12. The projection system includes a projection lens assembly generally designated at 44. A preferred form of the projection lens assembly is fully disclosed and claimed in the aforementioned co-pending patent application Ser. No. 563,949 filed Mar. 31, 1975 and which is assigned to the assignee of the present invention. The projection lens assembly 44 is held in place by plate 45 and includes a focusing adjustment knob 46 which when rotated causes the projection lens within the projection lens assembly to move vertically to provide focusing of the displayed image. The projection lens assembly has an optical axis designated at 47 in which the desired film frame is interposed for selection and viewing.

The projection system also includes a plurality of mirrors 48 and 49. Mirror 48 is shown schematically because mirrors of this type are well known in the art. Mirror 48 reflects the image to be displayed in a rearward direction towards mirror 49 which then reflects the image forward to the rear side of screen 12 to be displayed. The details of the mountings of the mirrors will not be described inasmuch as they are well known in the art. Upper housing 11 also includes an aperture 50 which allows the image to be displayed to pass from the projection lens assembly 44 to mirror 48.

Figure 2:
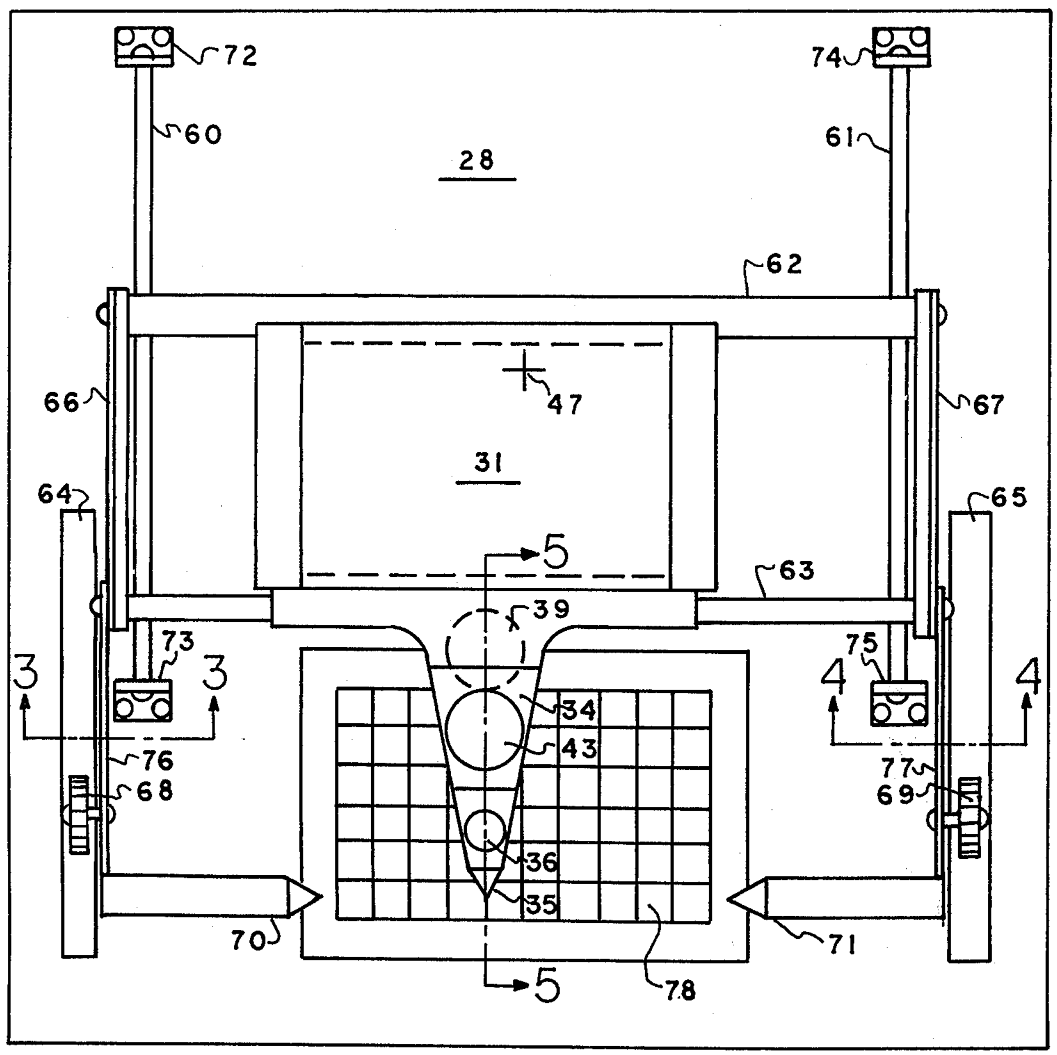
FIG. 2 is a top view of an ultrafiche carriage assembly embodying the present invention.

FIGS. 2–5 are detailed views of an ultrafiche carriage assembly embodying the present invention. Referring now to FIG. 2, the ultrafiche carriage assembly thereshown comprises glide members 60 and 61, glide bars 62 and 63, friction surfaces 64 and 65, side supports 66 and 67, wheels 68 and 69, indicators 70 and 71 and ultrafiche film holder 31.

Glide members 60 and 61 are spaced apart and substantially parallel and are secured to plate 28 by suitable L-brackets 72, 73, 74 and 75. Glide bars 62 and 63 are spaced apart and substantially parallel to one another and extend across glide members 60 and 61 in a transverse direction to the glide members 60 and 61. Glide bar 63 includes a rack 38 on a portion thereof more clearly shown in FIGS. 3 and 4.

Side supports 66 and 67 couple glide bars 62 and 63 together in fixed spaced apart relation and are coupled to extensions 76 and 77 respectively which include rotatable wheels 68 and 69 and indicators 70 and 71 respectively. Friction surfaces 64 and 65 extend alongside of glide members 60 and 61 respectively and communicate with the rotatable wheels 68 and 69 respectively.

Ultrafiche holder 31 extends across glide bars 62 and 63 so that as wheels 68 and 69 are rotated the ultrafiche holder and glide bars move in a first direction along glide members 60 and 61.

Figure 3:
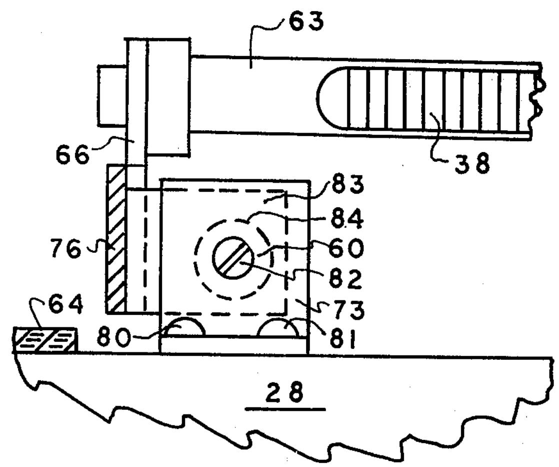
FIG. 3 is a cross-sectional view taken along lines 3—3 of FIG. 2.
Figure 4:
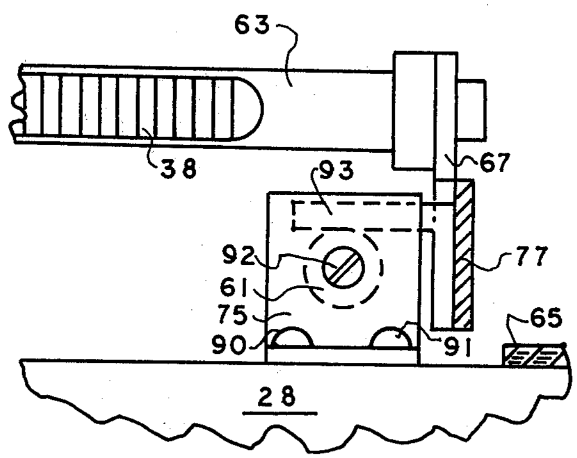
FIG. 4 is a cross-sectional view taken along lines 4—4 of FIG. 2.
Figure 5:
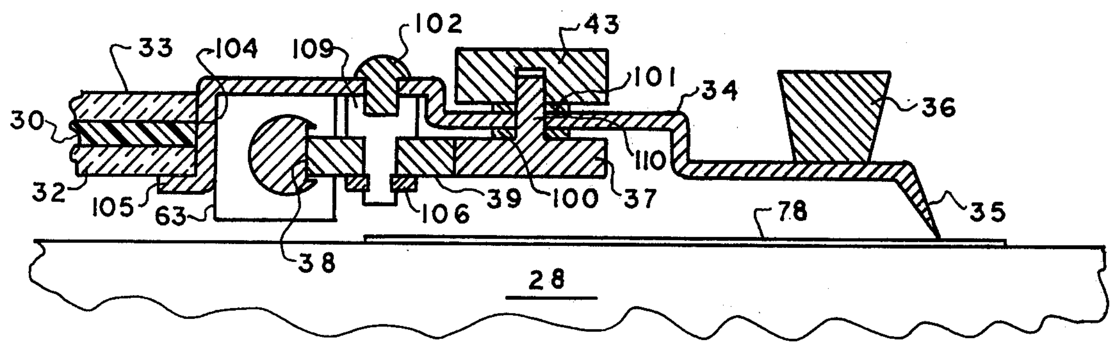
FIG. 5 is a cross-sectional view taken along lines 5—5 of FIG. 2.

Referring for the moment to FIGS. 3 and 4, L-shaped brackets 73 and 75 are secured to plate 28 by screws 80, 81 and 90, 91 respectively. Glide member 60 is secured to bracket 73 by threaded screw 82 and glide member 61 is secured to bracket 75 by screw 92.

Side support 66 includes a right angle flange 83 having an opening 84 adapted to receive glide member 60. Side support 66 includes two such right angle flanges, the second flange being behind and in line with flange 83 so that as the ultrafiche holder is moved in the first direction, it is moved in a guided manner by the coaction of the right angle flanges and the glide member 60.

Side support 67 also includes a right angle flange 93 which rests on top of glide member 61. A second right angle flange resting on top of glide member 61 is rearward of flange 93 and directly in line with it to provide additional support. Because glide member 60 is received by the right angle flanges of side support 66 and glide member 61 has the right angle flanges of side support 67 resting on top of it, binding of the glide member and the side supports during movement of the ultrafiche holder in the first direction is obviated.

Referring again to FIG. 2, the ultrafiche holder 31 comprises arm 34, idler 39, control knob 43, knob 36, and pointer 35. A portion of the film holder and details of arm 34 may be more clearly seen in the cross-sectional view of FIG. 5. Pinion 37 includes a shaft 110 which extends through an opening within arm 34 to be received by knob 43. Washers 100 and 101 space pinion 37 and knob 43 from arm 34 to facilitate easier rotation of pinion 37 by knob 43. Pinion 37 communicates with idler gear 39 which rotates about screw block 103. Idler gear 39 is spaced from arm 34 by block 103 which is secured to arm 34 by screw 102. Gear 39 is maintained on block 103 by E-ring 106. Gear 39 communicates with rack 38 which is contained within and along one side of glide bar 63. Arm 34 includes a downwardly extending portion 104 which terminates in a rearwardly extending lip 105 for confining the glass plates 32 and 33 which hold ultrafiche 30 therebetween. When knob 43 is rotated, pinion 37 is caused to rotate and because it communicates with gear 39, gear 39 rotates. As gear 39 rotates it communicates with rack 38 to cause the ultrafiche holder to move in a second direction along glide bars 62 and 63 which is transverse or perpendicular to the first direction of movement caused by the rotation of rotatable wheels 68 and 69 of FIG. 2.

Referring once again to FIG. 2, the carriage assembly also includes a grid 78 comprising a plurality of perpendicular lines defining squares arranged in rows and columns. Each of the squares of grid 78 corresponds to a respective one of the film frames of the ultrafiche and are spaced in relation to the ultrafiche, pointer 35, indicators 70 and 71, and the optical axis of the projection lens assembly designated at 47 to thereby provide film frame location indicia for each film frame of the ultrafiche.

In operation, assuming that each film frame is assigned a particular location, an operator by using knob 36 will make a course adjustment as to the location of the desired film frame by merely pushing knob 36 back and forth and side to side to arrive at the general location of the desired film frame. Then, the operator rotates wheels 68 and 69 to locate the row in which the desired film is. When indicators 70 and 71 point to the desired row, knob 43 is rotated to cause pointer 35 to arrive at the desired column in which the desired film frame is located.

Inasmuch as film holder 31 is being moved relative to optical axis 47 which is stationary, the location indicia of grid 78 is preferably the mirror image of the locations of the various film frames on ultrafiche 30. Additionally, in its preferred form, friction surfaces 64 and 65 may be made of a cork material assuring frictional engagement between surfaces 64 and 65 and rotatable wheels 68 and 69.

Of course, by properly choosing the gear ratios of pinion 37, gear 39 and rack 38 any desired mechanical advantage can be obtained. Likewise, the diameters of rotatable wheels 68 and 69 may also be adjusted to provide any desired degree of control.

The present invention there provides a means by which mechanical assistance can be afforded an operator of an ultrafiche reader for positioning the ultrafiche film frames relative to the ultrafiche reader optical axis and light system. The present invention also provides course adjustment of the position of a desired film frame and additionally, vernier control for fine adjustment of the position of the desired film frame relative to the light system and optical axis.

While a particular embodiment of the invention has been shown and described, modifications may be made and it is intended in the appended claims to cover all such modifications as may fall within the true spirit and scope of the invention.

I claim:

1. In an ultrafiche reader apparatus of the type which includes a light system and a projection system for projecting a magnified image of a selected one of a plurality of ultrafiche film frames onto a reference surface, an improved ultrafiche carriage assembly for positioning a desired one of said film frames between the light system and projection system comprising:

a pair of spaced apart and substantially parallel glide members;

first and second spaced apart and substantially parallel glide bars extending across said pair of glide members and transverse to said glide members, said second glide bar including a rack on a portion of at least one side thereof;

a friction surface extending alongside of each of said glide members;

first and second side supports for coupling said first and second glide bars together in fixed spaced apart relation, each of said first and second side supports including a rotatable wheel communicating with one of said friction surfaces; and an ultrafiche holder adapted for receiving an ultrafiche and extending across said first and second glide bars and including a rotatable pinion coupled to said rack of said second glide bar, whereby as said friction wheels are rotated, said ultrafiche holder is caused to glide along said first and second members in a first direction and as said pinion is rotated said ultrafiche holder is caused to glide upon said glide bars in a second direction transverse to said first direction to thereby afford positioning of a selected film frame between the light system and projection system.

2. An apparatus in accordance with claim 1 further comprising an index grid having a location indicia for each film frame on the ultrafiche and wherein each said side support includes an indicator in spaced relation to said grid, said ultrafiche and the light and projection systems so that said indicator indicates on said grid the accurate position of said film frames for said first direction of movement.

3. An apparatus in accordance with claim 2 wherein said ultrafiche holder includes an indicator in spaced relation to said grid, said ultrafiche and the light and projection systems so that said holder indicator indicates on said grid the accurate position of said film frames for said second direction of movement.

4. An apparatus in accordance with claim 3 wherein said grid comprises a first plurality of parallel lines and a second plurality of parallel lines, said second plurality of lines being transverse to said first plurality of lines to thereby provide film frame location indicia arranged in columns and rows to thereby accommodate an ultrafiche having film frames correspondingly arranged in columns and rows.

5. An apparatus in accordance with claim 1 wherein one of said side supports additionally includes a plurality of guide openings adapted to receive one of said glide members to thereby guide the movement of said holders in said first direction.

6. An apparatus in accordance with claim 5 wherein the other of said side supports includes a portion resting on the other of said glide members.

7. An apparatus in accordance with claim 1 wherein said pinion is coupled to said rack by an idler gear.

8. An ultrafiche reader apparatus of the type which includes a light system and a projection system for projecting a magnified image of a selected one of a plurality of ultrafiche film frames therebetween onto a reference surface, an improved ultrafiche carriage assembly for positioning a desired one of said film frames between the light system and the projection system comprising:

a pair of spaced apart and substantially parallel glide members;

first and second spaced apart and substantially parallel glide bars extending across said pair of glide members and transverse to said glide members, said second glide bar including a rack on a portion of at least one side thereof;

a friction surface extending alongside of each of said glide members;

first and second side supports for coupling said first and second glide bars together in fixed spaced apart relation, one of said side supports including guide openings for receiving one of said glide members, the other of said side supports including a portion resting upon the other of said glide members, and each side support including a rotatable wheel communicating with one of said friction surfaces;

an ultrafiche holder adapted for receiving an ultrafiche and extending across said first and second glide bars and including a rotatable pinion coupled to said rack of said second glide bar;

an index grid having a location indicia for each film frame on the ultrafiche;

a location indicator coupled to each said side support in spaced relation to said grid, said ultrafiche and the light and projection systems to indicate on said grid the accurate position of said film frames in a first direction; and an indicator coupled to said ultrafiche holder in spaced relation to said grid, said ultrafiche and the light and projection systems to indicate on said grid the accurate position of said film frames in a second direction;

whereby as said friction wheels are rotated said ultrafiche holder is caused to glide in guided movement along said first and second members in a first direction and as said pinion is rotated said ultrafiche holder is caused to glide upon said glide bars in said second direction transverse to said first direction while said side support indicators indicate the accurate position of said film frames for said first direction of movement and said holder indicator indicates on said grid the accurate position of said film frames for said second direction of movement.

* * * * *